US012018624B1

(12) United States Patent
Hinchy

(10) Patent No.: US 12,018,624 B1
(45) Date of Patent: Jun. 25, 2024

(54) CAMLESS ENGINES

(71) Applicant: Patrick Hinchy, Holland, NY (US)

(72) Inventor: Patrick Hinchy, Holland, NY (US)

(*) Notice: Subject to any disclaimer, the term of this patent is extended or adjusted under 35 U.S.C. 154(b) by 0 days.

(21) Appl. No.: 18/504,199

(22) Filed: Nov. 8, 2023

(51) Int. Cl.
*F02D 21/02* (2006.01)
*F02D 41/00* (2006.01)
*F02D 41/40* (2006.01)
*F02P 5/15* (2006.01)

(52) U.S. Cl.
CPC ........... *F02D 21/02* (2013.01); *F02D 41/009* (2013.01); *F02D 41/40* (2013.01); *F02P 5/1502* (2013.01); *F02D 2400/04* (2013.01)

(58) Field of Classification Search
CPC ......... F02D 21/02; F02D 41/40; F02D 41/009
See application file for complete search history.

(56) References Cited

U.S. PATENT DOCUMENTS

| | | | | |
|---|---|---|---|---|
| 4,009,695 | A | 3/1977 | Ule | |
| 7,278,393 | B2 | 10/2007 | Hayakawa et al. | |
| 8,484,971 | B2 | 7/2013 | Schaffeld et al. | |
| 8,567,191 | B2 | 10/2013 | Geyer | |
| 8,613,269 | B2 | 12/2013 | Shehter et al. | |
| 9,121,337 | B1 | 9/2015 | Cheng | |
| 9,850,856 | B1 | 12/2017 | Turner, Jr. et al. | |
| 10,422,271 | B2 | 9/2019 | Bunjes | |
| 11,060,443 | B1 * | 7/2021 | Thomas | F02M 61/14 |
| 2015/0285135 | A1 * | 10/2015 | Sexton | F02D 19/02 123/294 |
| 2019/0338730 | A1 | 11/2019 | Kolhouse et al. | |

FOREIGN PATENT DOCUMENTS

| | | | |
|---|---|---|---|
| DE | 102004022490 | B4 | 2/2021 |
| EP | 0846848 | A1 | 6/1998 |
| JP | 2005171794 | A | 6/2005 |
| JP | 2007071037 | A | 3/2007 |
| WO | 2017179032 | | 10/2017 |

OTHER PUBLICATIONS

Mark Archer, Greg Bell, Advanced Electronic Fuel Injection Systems, Dec. 31, 2001 (accessed Jul. 21, 2023), https://citeseerx.ist.psu.edu/document?repid=rep1&type=pdf&doi=38ca9e788e5a07ab3a1fb4a088bc14a705bdda8f.
mechanic.com.au, FreeValve's Camless Engine Explained, Feb. 8, 2019 (accessed Jul. 21, 2023), https://trade.mechanic.com.au/news/freevalve-s-camless-engine-explained1.
Ruitao Song, Optimal Combustion Phasing Modeling and Control of a Turbulent Jet Ignition Engine, Dec. 31, 2018 (accessed Jul. 21, 2023), https://www.egr.msu.edu/zhug/Publications/Journal%20Articles/Optimal%20Combustion%20Phasing%20Modeling%20and%20Control.pdf.

* cited by examiner

*Primary Examiner* — Kevin A Lathers
(74) *Attorney, Agent, or Firm* — Mertzlufft Law PLLC; Joshua Mertzlufft

(57) ABSTRACT

Implementations herein may include camless engines and methods for operating the same. An engine may comprise a cylinder including a cylinder wall, a piston, a compression ring disposed about the piston, and a cylinder head; a fuel injector in fluid communication with the combustion chamber; an air injector in fluid communication with the combustion chamber; an ignition device in communication with the combustion chamber; an exhaust port in fluid communication with an exhaust manifold and the cylinder; an angular position sensor configured to measure an angular position of a crankshaft in mechanical communication with the piston; and a controller configured to control the fuel injector, the air injector, and the ignition device.

20 Claims, 12 Drawing Sheets

Sections show air rails at 180 degrees for clarity

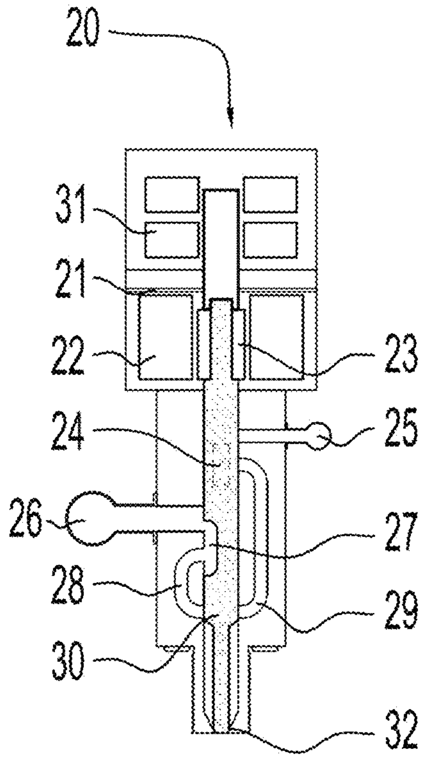
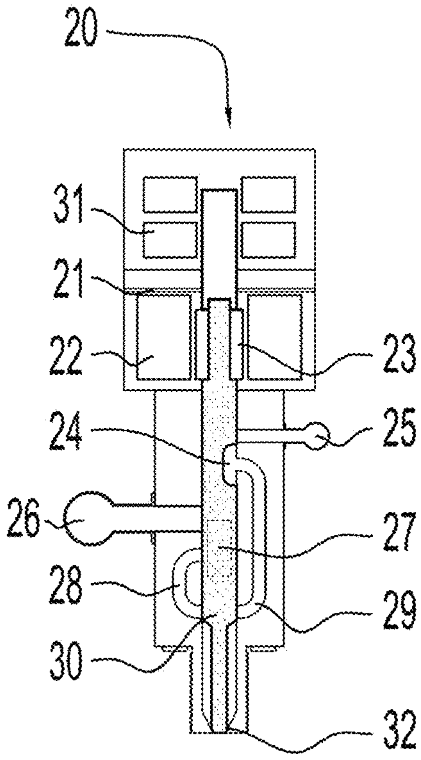
Sections show air rails at 180 degrees for clarity
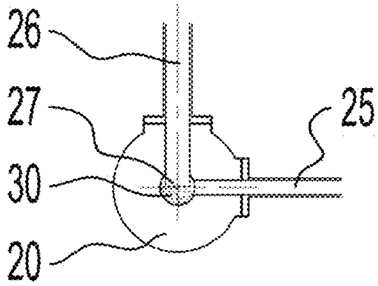
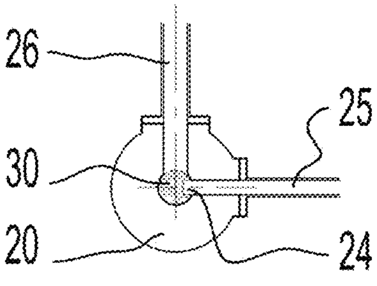
FIG. 2K
FIG. 2L

CAMLESS ENGINES

BACKGROUND

Internal combustion engines are the most common power plant used in modern automobiles. Including automobiles, rotary-shaft-driving internal combustion engines are used in a variety of applications where a rotary motion is used to drive a system. Conventional rotary-shaft-driving internal combustion engines operate by converting translational motion of a piston caused by combustion within a cylinder to rotary motion of a crankshaft.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

Implementations may include an engine. The engine may include a cylinder, a fuel injector, an air injector, an ignition device, an exhaust port, an angular position sensor, and a controller. The cylinder may include a cylinder wall, a piston having a compression ring disposed about the piston, and a cylinder head.

Further implementations may include a method of operating an engine.

The method may include providing the engine. The engine may include a cylinder, a fuel injector, an air injector, an ignition device, an exhaust port, an angular position sensor, and a controller. The cylinder may include a cylinder wall, a piston having a compression ring disposed about the piston, and a cylinder head.

The method may include determining, using the controller, a cylinder power output based on a requested engine power output.

The method may include determining, using the controller, based on the cylinder power output, for example, the fuel quantity, the air quantity, a first angular position of the crankshaft for commencing injecting the fuel quantity, a second angular position of the crankshaft for commencing injecting the air quantity, or a third angular position of the crankshaft for activating the ignition device.

The method may include, when the angular position reaches the first angular position, instructing, using the controller, the fuel injector to commence injecting the fuel quantity into the combustion chamber.

The method may include, when the angular position reaches the second angular position, instructing, using the controller, the air injector to commence injecting the air quantity into the combustion chamber.

The method may include, when the angular position reaches the third angular position, activating, using the controller, the ignition device.

In various implementations, the cylinder wall, the piston, the compression ring, and the cylinder may define a combustion chamber.

In various implementations, the piston may be configured to slide between a first position of the piston within the cylinder and a second position of the piston within the cylinder, such that a volume of the combustion chamber is greater when the piston is in the second position relative to when the piston is in the first position. In some implementations, the first position of the piston within the cylinder is a top-dead-center (TDC) position of the piston. In some implementations, the second position of the piston within the cylinder is a bottom-dead-center (BDC) position of the piston.

In various implementations, the fuel injector may be integrated with the cylinder head. The fuel injector may be in fluid communication with the combustion chamber. The fuel injector may be configured to inject a fuel quantity into the combustion chamber during a stroke of the piston.

In various implementations, the air injector may be integrated with the cylinder head. The air injector may be in fluid communication with the combustion chamber. The air injector may be configured to inject an air quantity to the combustion chamber during the stroke of the piston.

In various implementations, the air injector may be defined by, for example, an inlet, an outlet, a nozzle, a first internal pathway, and a second internal pathway. The air injector may comprise an injector needle, which may include a first slot and a second slot. The air injector may be configured such that: when the injector needle is in a first open position, the first slot may be aligned with the inlet and the first internal pathway such that the inlet and the nozzle may be in fluid communication via the first internal pathway and the second slot may be not aligned with the outlet and the second internal pathway, thereby restricting fluid communication between the outlet and the nozzle; when the injector needle is in a second open position, the second slot may be aligned with the outlet and the second internal pathway such that the outlet and the nozzle may be in fluid communication via the second internal pathway and the first slot may be not aligned with the inlet and the first internal pathway, thereby restricting fluid communication between the inlet and the nozzle; or when the injector needle is in a closed position, the injector needle may restrict fluid communication between the nozzle and both the first internal pathway and the second internal pathway.

In various implementations, the air quantity injected may be sufficient to develop a pressure ranging from 10 to 3000 psi within the combustion chamber.

In various implementations, the stroke of the piston may be, for example, a power stroke of the piston, a compression stroke of the piston, or a passive stroke of the piston.

In various implementations, the ignition device may be in communication with the combustion chamber. The ignition device may be, for example, a spark plug.

The exhaust port may be in fluid communication with an exhaust manifold and the cylinder such that passage of fluid between the exhaust port and the combustion chamber may be prevented by the compression ring when the piston is in the first position.

In various implementations, the angular position sensor may be configured to measure an angular position of a crankshaft in mechanical communication with the piston.

In various implementations, the controller may be configured to control the fuel injector, the air injector, and the ignition device.

In various implementations, the controller may be configured to determine a cylinder power output based on a requested engine power output.

In various implementations, the controller may be further configured to determine, based on the cylinder power output, for example, the fuel quantity, the air quantity, a first angular position of the crankshaft for commencing injecting the fuel quantity, a second angular position of the crankshaft for commencing injecting the air quantity, or a third angular position of the crankshaft for activating the ignition device.

In various implementations, the controller may be further configured to, when the angular position reaches the first angular position, instruct the fuel injector to commence injecting the fuel quantity into the combustion chamber.

In various implementations, the controller may be further configured to, when the angular position reaches the second angular position, instruct the air injector to commence injecting the air quantity into the combustion chamber.

In various implementations, the controller may be further configured to, when the angular position reaches the third angular position, activate the ignition device.

In various implementations, the controller may be further configured to control the fuel injector, the air injector, and the ignition device such that the engine operates in a two-stroke mode, a variable-stroke mode, or a hit-and-miss mode.

In various implementations, the engine may not comprise a camshaft, an intake valve configured to seat to the cylinder head, or an exhaust valve configured to seat to the cylinder head.

BRIEF DESCRIPTION OF THE FIGURES

For a fuller understanding of the nature and objects of the disclosure, reference should be made to the following detailed description taken in conjunction with the accompanying drawings, in which:

FIGS. 2H, 2J, 2K, and 2L illustrate elevation and plan views of a bi-directional air injector in various states, according to one or more implementations herein.

DETAILED DESCRIPTION

Figure 1:
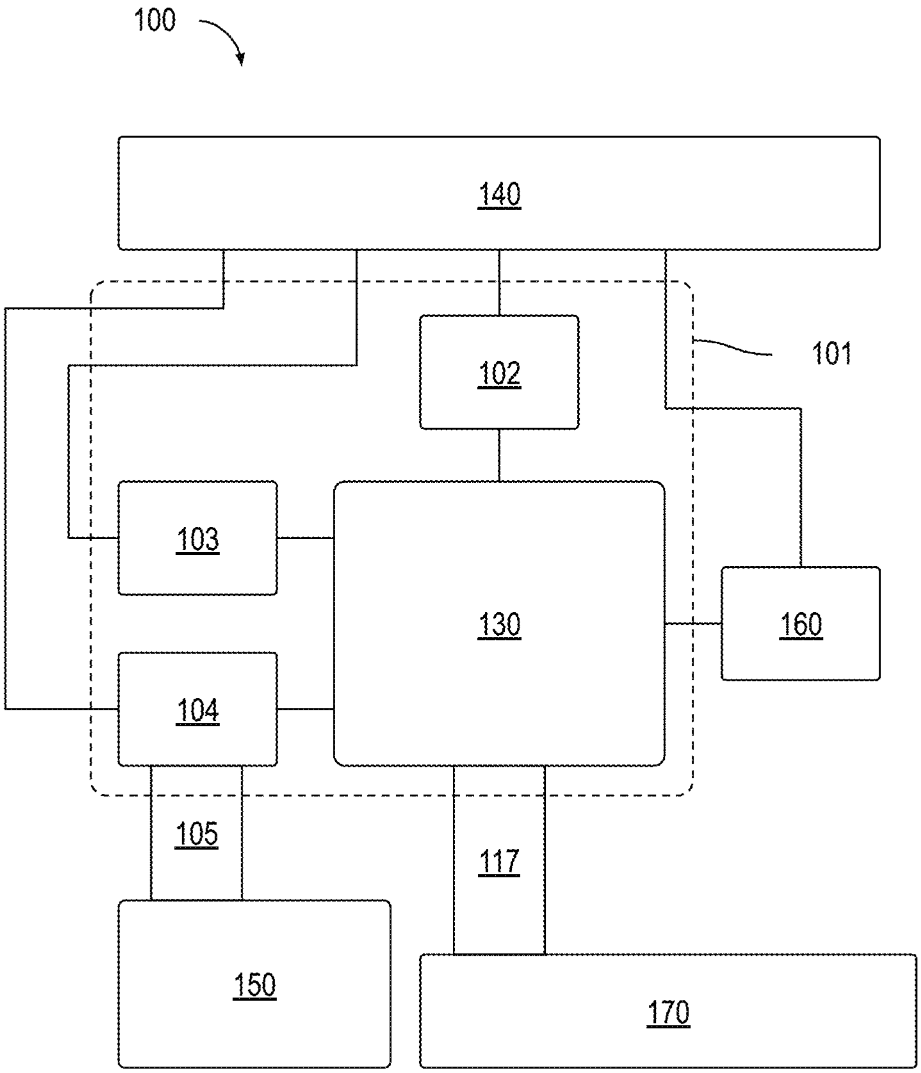
FIG. 1 illustrates a block diagram of a camless engine, according to one or more implementations herein.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

Internal combustion engines convert chemical energy into mechanical energy through the process of burning a mixture of fuel and air. An internal combustion engine operates on the principle of drawing in a fuel-air mixture, compressing it, igniting it to cause an explosion, which pushes a piston downward, and then expelling the resultant exhaust gases.

For example, within a conventional four-stroke automotive engine, this sequence of events occurs in a specific order within the engine cylinders: intake, compression, power, and exhaust. In the intake stroke, the engine draws the fuel-air mixture into a combustion chamber of the cylinder through an intake valve as the piston moves downward. This is followed by the compression stroke where the piston moves upwards, compressing the mixture into a smaller volume and thus increasing pressure within the combustion chamber. Upon reaching the highest point of compression, a spark plug ignites the compressed mixture, causing it to combust and release energy in the power stroke, which forces the piston back down. The energy released during the power stroke is what drives the piston, which drives the crankshaft, and ultimately, a vehicle's wheels. Finally, in the exhaust stroke, waste gases are expelled from the cylinder through an exhaust valve, preparing the cylinder for the next intake stroke.

The cyclic repetition of these four strokes enables the internal combustion engine to produce continuous power. The engine's output, in terms of speed and torque, may conventionally be adjusted by controlling the quantity of fuel delivered and the timing of the ignition. Moreover, the efficiency, power, and emissions of the engine may be influenced by various design choices and technologies, such as the type of fuel injection system, valve timing mechanisms, and exhaust after-treatment systems.

Four-stroke internal combustion engines have employed carburetors or fuel injectors for delivery of fuel, and camshaft-driven air intake valves and exhaust valves for intake of air and expression of exhaust gases, respectively. When closed, such intake valves and exhaust valves conventionally seat to the cylinder head.

Carburetors operate on the principle of air drawn into the engine passing through the carburetor, where it creates a vacuum that siphons fuel from the carburetor's reservoir via a fuel jet. This fuel-air mixture is then delivered into the engine's combustion chambers. While carburetors are mechanically simple and robust, they have inherent limitations. The mixing of fuel and air may not be precise across a range of operating conditions, leading to inconsistent fuel-to-air ratios. As such, conventional carburetors suffer shortcomings of suboptimal combustion, reduced fuel efficiency, and increased emissions.

Conventional fuel injectors operate as a component of electronic fuel injection systems and provide a more precise method of fuel delivery than carburetors. Controlled by the engine's electronic control unit, fuel injectors may inject (e.g., spray) atomized fuel directly into the combustion chamber or just ahead of the intake valve, depending on the design. The electronic control unit may adjust the timing and amount of fuel injected based on various engine parameters like load, temperature, speed, and more. This may enable maintenance of a fuel-to-air ratio across a broad spectrum of operating conditions. This may result in more complete combustion, which may improve fuel efficiency and engine performance and may reduce emissions.

Two-stroke internal combustion engines operate differently from conventional four-stroke internal combustion engines, achieving the same basic functions of intake, compression, combustion, and exhaust in only two piston strokes rather than four.

In a two-stroke engine, the process begins with the piston at its lowest point. As the piston rises, it compresses the fuel-air mixture in the cylinder. Simultaneously, underneath the piston, a fresh charge of fuel, oil, and air is drawn into the crankcase. Once the piston nears the top of its stroke, a spark plug ignites the compressed mixture, driving the piston downward in what constitutes the power stroke. As the piston descends, it increases the pressure in the crankcase, forcing the fresh fuel-air mixture to be pushed through one or more transfer reeds into the cylinder. This incoming charge helps expel the exhaust gases via an exhaust port, which may overlap the intake or transfer port in timing. Conventional two-stroke engines are often noisier than four-stroke engines and have a distinctive blue smoke in their exhaust due to incomplete combustion and oil mixed with fuel to lubricate the piston.

A two-stroke engine's advantage over a four-stroke engine may flow from its power-to-weight ratio, as it produces power with every revolution of the crankshaft, compared to every other revolution in a four-stroke engine. However, the design's inherent inefficiencies, such as incomplete combustion and the potential for unburned fuel and oil to be expelled, lead to increased emissions and lower fuel efficiency. As such, conventional automotive and many other applications favor the four-stroke design for its cleaner operation and fuel efficiency.

Conventional attempts have been made to increase the power output of four-stroke internal combustion engines. Such conventional attempts may include increasing the number of cylinders, using a turbocharger, using a supercharger, and using an air injector.

One conventional attempt at increasing power output of a four-stroke internal combustion engine is to increase the number of cylinders. More cylinders mean that more fuel and air can be burned and more power strokes occur in a given time frame. This not only increases power but also generally smooths out engine operation. For example, six-cylinder and eight-cylinder engines typically produce more power than a four-cylinder engine of the same displacement and can run more smoothly due to the increased frequency of power strokes. However, adding more cylinders suffers from the shortcoming of a heavier engine and thus more power is needed just to move the engine.

Another conventional attempt at increasing power output of a four-stroke internal combustion engine is to use a turbocharger. A turbocharger is a forced induction system that utilizes the engine's exhaust gases to spin a turbine. This turbine is directly connected to a compressor that forces more air into the combustion chamber than would be possible with atmospheric pressure alone. By increasing the air density entering the combustion chamber, more fuel can be added and burned, resulting in a significant power boost. Additionally, turbochargers are energy-efficient as they recycle exhaust gases. However, they might suffer from lag, sometimes referred to as "turbo lag," which is a delay in power delivery until the turbo spools up. Further, turbochargers are dependent on engine operation and add complexity to the engine and impact longevity of the engine.

Another conventional attempt at increasing power output of a four-stroke internal combustion engine is to use a supercharger. Like a turbocharger, a supercharger is also a forced induction system designed to increase the amount of air delivered to an engine's combustion chamber. However, instead of being driven by exhaust gases, a supercharger is mechanically driven by the engine, often via a belt connected to the crankshaft. This direct connection means that superchargers can provide immediate power increases without the lag sometimes experienced with turbochargers. However, because they are mechanically driven, they take some power from the engine to operate, slightly offsetting their gains. Further, superchargers are dependent on engine rotation and add complexity to the engine and impact longevity of the engine.

Conventional turbochargers and superchargers create a positive pressure up to a maximum of about 8 psi. Even with this pressure the compression ratio of a cylinder may need to remain around 7:1 or 8:1 to keep it from overstressing the engine components.

Even in each of these conventional attempts at increasing the power output of a four-stroke engine, the engine still requires a mechanically-driven exhaust valve. Conventional, mechanically driven exhaust valves are operated by a camshaft, which is turned by the engine via a timing system (e.g., a timing chain). Because of this, the cycle of the engine is conventionally unchangeable, as the exhaust valve will mechanically open in accordance with the specifications of the camshaft.

Conventionally, even in electronically-controlled or variable-valve-timed engines, height and duration of the intake and exhaust valves' opening is set or fixed by the camshaft lobe profile (e.g., its grind).

Conventional valve springs require between 200 and 400 pounds of force to completely open the valve. The higher revolutions-per-minute (RPM) the engine is designed to operate, the higher the valve spring rate has to be in order to keep the valves from floating. Not only is energy spent in conventional engines to spin the camshaft within its bearings, but energy must be spent to overcome frictional forces between the camshaft and lifters, lift the lifters, and push rods, the frictional forces of the rocker arms, and compress the valve springs forcing the valves to open the correct distance. Conventional four-stroke engines must expend energy to do this twice for each single power stroke.

A conventional attempt to solve the problem of the force required to open an engine valve is use of an electromagnetic valve. However, shortcomings of such a conventional attempt include that either a spring may still be used and, whether or not a spring is used, the valve presents an opportunity for interference with the piston, which is a particular danger if electrical power is lost during operation.

Implementations herein include engines having one or more engine cylinders implementing a fuel injector, an air injector, and an exhaust port in a valve-less and reed-less system, thus providing for a variable-stroke camless engine. By valve-less, implementations do not implement an intake valve or an exhaust valve configured to seat to a cylinder head.

FIG. 1 illustrates a block diagram of a camless engine 100, according to one or more implementations herein. It will be understood that the engine cylinder may operate in high-pressure or low-pressure modes of operation or in various cycle modes. While one cylinder 130 is depicted, it is understood that varying numbers of cylinders may be operable in some implementations.

Camless engine 100 may include an engine cylinder 101, which may comprise a cylinder 130, a fuel injector 103, an air injector 104, an ignition device 102, an exhaust port 117 providing an exhaust pathway to an exhaust manifold 170, an angular position sensor 160 (e.g., a 360-degree position sensor), and a controller 140. Cylinder 130 may include a cylinder wall, a piston having a compression ring disposed about the piston, and a cylinder head.

Fuel injector 103 may be integrated with a cylinder head of cylinder 130. Fuel injector 103 may be in fluid communication (e.g., enabling flow of fluids such as gasses and/or liquids (e.g., regular liquids, atomized liquids, semi-liquids) therebetween) with the combustion chamber. Fuel injector 103 may be configured to inject a fuel quantity into the combustion chamber during a stroke of the piston of cylinder 130.

Air injector 104 may be integrated with a cylinder head of cylinder 130. Air injector 104 may be in fluid communication with the combustion chamber. Air injector 104 may be configured to inject an air quantity to the combustion chamber during the stroke of the piston of cylinder 130. Air injector 104 may supply the air in either high or low pressure depending on the mode of operation of the engine and/or engine cylinder. By injecting both air and fuel into the cylinder, the fuel may be atomized within the cylinder.

Air may be delivered via air injector 104 from an air rail 105 from a compressor 150. Compressor 150 may be capable of supplying the air quantity required at least up to the maximum power output at the pressure needed for at least up to the maximum power output. Compressor 150 may be driven from the engine using a drive belt or chain, or may be driven using electrical power derived from an alternator of the engine and may include a compressed air storage tank. The compressed air storage tank may be sized to enable an anticipated maximum power output duration. Compressor 150 may be able to turn on and off so that it can disabled when not needed, for example, during lower-power conditions (e.g., via an electrical switch or magnetic clutch).

The air quantity injected may be sufficient to develop a pressure ranging from 10 to 3000 psi within the combustion chamber. Controller 140 may determine the desired pressure based on desired cylinder and/or engine power and input from the angular position sensor 160.

The stroke of the piston referenced may be, for example, a power stroke of the piston, a compression stroke of the piston, or a passive stroke of the piston. Controller 140 may determine which stroke is applicable for a given cycle.

Ignition device 102 may be in communication with the combustion chamber of cylinder 130. Ignition device 102 may be, for example, a spark plug, a glow plug, or another ignition device.

Exhaust port 117 may be in fluid communication with exhaust manifold 170 and cylinder 130 via an exhaust pathway such that passage of fluid between exhaust port 117 and the combustion chamber may be prevented by the compression ring of the piston when the piston is in the first position.

Angular position sensor 160 may be configured to measure an angular position of a crankshaft mechanically connected to engine cylinder 101 and in mechanical communication with the piston.

Controller 140 may be configured to control fuel injector 103, air injector 104, and ignition device 102. Controller 140 may be configured to determine a cylinder power output based on a requested engine power output (e.g., from an accelerator input, a user selection, etc.). Controller 140 may be further configured to determine, based on the cylinder power output, for example, the fuel quantity, the air quantity, a first angular position of the crankshaft for commencing injecting the fuel quantity, a second angular position of the crankshaft for commencing injecting the air quantity, or a third angular position of the crankshaft for activating ignition device 102. Controller 140 may be further configured to, when the angular position reaches the first angular position, instruct fuel injector 103 to commence injecting the fuel quantity into the combustion chamber of cylinder 130. Controller 140 may be further configured to, when the angular position reaches the second angular position, instruct air injector 104 to commence injecting the air quantity into the combustion chamber of cylinder 130. Controller 140 may be further configured to, when the angular position reaches the third angular position, activate ignition device 102. It is understood that the order of the first angular position, the second angular position, and the third angular position may vary between implementations, between cycles, or between groups of cycles. It is further understood that the first angular position, the second angular position, or the third angular position may all be different or two or more of the first angular position, the second angular position, or the third angular position may be equal.

Controller 140 may be further configured to control fuel injector 103, air injector 104, and ignition device 102 such that the engine operates in a two-stroke mode, a variable-stroke mode, or a hit-and-miss mode. As such, the engine cylinder 101 and/or engine 100 may operate in a two-stroke mode, or utilize a variable-stroke or hit-and-miss mode to mimic a four-stroke mode, a 4-6-8 mode, or a hit-and-miss (engine) mode.

By obviating the need for a camshaft and an exhaust valve in implementations herein, efficiency of the engine is increased as fewer components must be mechanically driven by the engine. Advantages also include a simplified complexity of the engine, and thus increased mechanical reliability and longevity. Further advantages include an ability to adjust power output or engine stroke or operational mode, even while the engine is in operation. Yet further advantages include increased engine efficiency for a given power output, improved fuel economy, and decreased emissions.

Yet further advantages may include obviating a need for a starter motor or manual crank, as implementations can initiate operation from full-stop. The controller via the angular position sensor can determine which cylinder is in position for the injection of air, fuel and then ignition. The controller can thus provide the air and fuel and then ignition to the cylinder to get the engine started.

Implementations may operate in a two-stroke mode of operation, or in a variable (e.g., selective cylinder cycling or firing) or hit-and-miss (e.g., permitting the engine to freely spin for one or more cycles without fuel delivery, air delivery, or combustion) mode of operation, which can be used to provide a pseudo-4-stroke mode of operation or a disabled-cylinder (e.g., 4-6-8) mode of operation. For example, the engine may be controlled to operate in a two-stroke mode when higher power is needed (e.g., during acceleration) and may operate in a 4-stroke, hit-and-miss, or disabled-cylinder mode when higher power is not needed (e.g., while cruising).

FIGS. 2A-2G illustrate an engine cylinder in various states during a cycle from just prior to top-dead-center (TDC) until reaching a similar state in a subsequent cycle, according to one or more implementations herein. An exhaust port mode of operation, for example, in a high pressure mode of operation, may be depicted. It will be understood that the engine cylinder may operate in low-pressure modes of operation or in various cycle modes. Within each of FIGS. 2A-2G, the engine cylinder 1 is depicted.

The engine cylinder may include a cylinder 1, a fuel injector 3, an air injector 4, an ignition device 2, an exhaust port 17 providing an exhaust manifold 9, an angular position sensor, and a controller. The cylinder may include an engine block's cylinder wall 7, a piston 6 having a compression ring disposed about piston 6, and a cylinder head 8. The engine block's cylinder wall 7 may include an engine coolant pathway 16.

In various implementations, cylinder wall 7, piston 6, the compression ring, and cylinder 1 may define a combustion chamber.

In various implementations, piston 6 may be configured to slide between a first position of the piston within cylinder 1 and a second position of the piston within cylinder 1, such that a volume of the combustion chamber is greater when the piston is in the second position relative to when the piston is in the first position. In some implementations, the first position of the piston within cylinder 1 is a top-dead-center (TDC) position of the piston. In some implementations, the second position of the piston within cylinder 1 is a bottom-dead-center (BDC) position of the piston.

In various implementations, fuel injector 3 may be integrated with cylinder head 8. Fuel injector 3 may be in fluid communication with the combustion chamber. Fuel injector 3 may be configured to inject a fuel quantity into the combustion chamber during a stroke of piston 6.

In various implementations, air injector 4 may be integrated with cylinder head 8. Air injector 4 may be in fluid communication with the combustion chamber. Air injector 4 may be configured to inject an air quantity to the combustion chamber during the stroke of piston 6. Air injector 4 may be fed by an air supply rail 5.

In various implementations, the air quantity injected may be sufficient to develop a pressure ranging from 10 to 3000 psi within the combustion chamber.

In various implementations, the stroke of piston 6 referenced may be, for example, a power stroke of the piston, a compression stroke of the piston, or a passive stroke of the piston.

In various implementations, ignition device 2 may be in communication with the combustion chamber. Ignition device 2 may be, for example, a spark plug.

Exhaust port 17 may be in fluid communication with an exhaust manifold 9 and the cylinder via an exhaust pathway such that passage of fluid between exhaust port 17 and the combustion chamber may be prevented by the compression ring when piston 6 is in the first position.

In various implementations, the angular position sensor may be configured to measure an angular position of a crankshaft 10 in crankcase 15 (e.g., the engine oil pan). Crankshaft 10 may be in mechanical communication with piston 6 via a connecting rod 11.

In various implementations, the controller may be configured to control fuel injector 3, air injector 4, and ignition device 2.

In various implementations, the controller may be configured to determine a cylinder power output based on a requested engine power output.

In various implementations, the controller may be further configured to determine, based on the cylinder power output, for example, the fuel quantity, the air quantity, a first angular position of crankshaft 10 for commencing injecting the fuel quantity, a second angular position of crankshaft 10 for commencing injecting the air quantity, or a third angular position of crankshaft 10 for activating ignition device 2.

In various implementations, the controller may be further configured to, when the angular position reaches the first angular position, instruct fuel injector 3 to commence injecting the fuel quantity into the combustion chamber.

In various implementations, the controller may be further configured to, when the angular position reaches the second angular position, instruct air injector 4 to commence injecting the air quantity into the combustion chamber.

In various implementations, the controller may be further configured to, when the angular position reaches the third angular position, activate ignition device 2.

In various implementations, the controller may be further configured to control fuel injector 3, air injector 4, and ignition device 2 such that the engine operates in a two-stroke mode, a variable-stroke mode, or a hit-and-miss mode. As such, the cylinder and/or engine may operate in a two-stroke mode, or utilize a variable-stroke or hit-and-miss mode to mimic a four-stroke mode, a 4-6-8 mode, or a hit-and-miss (engine) mode.

In various implementations, the engine may not comprise a camshaft, an intake valve, or an exhaust valve.

Figure 2A:
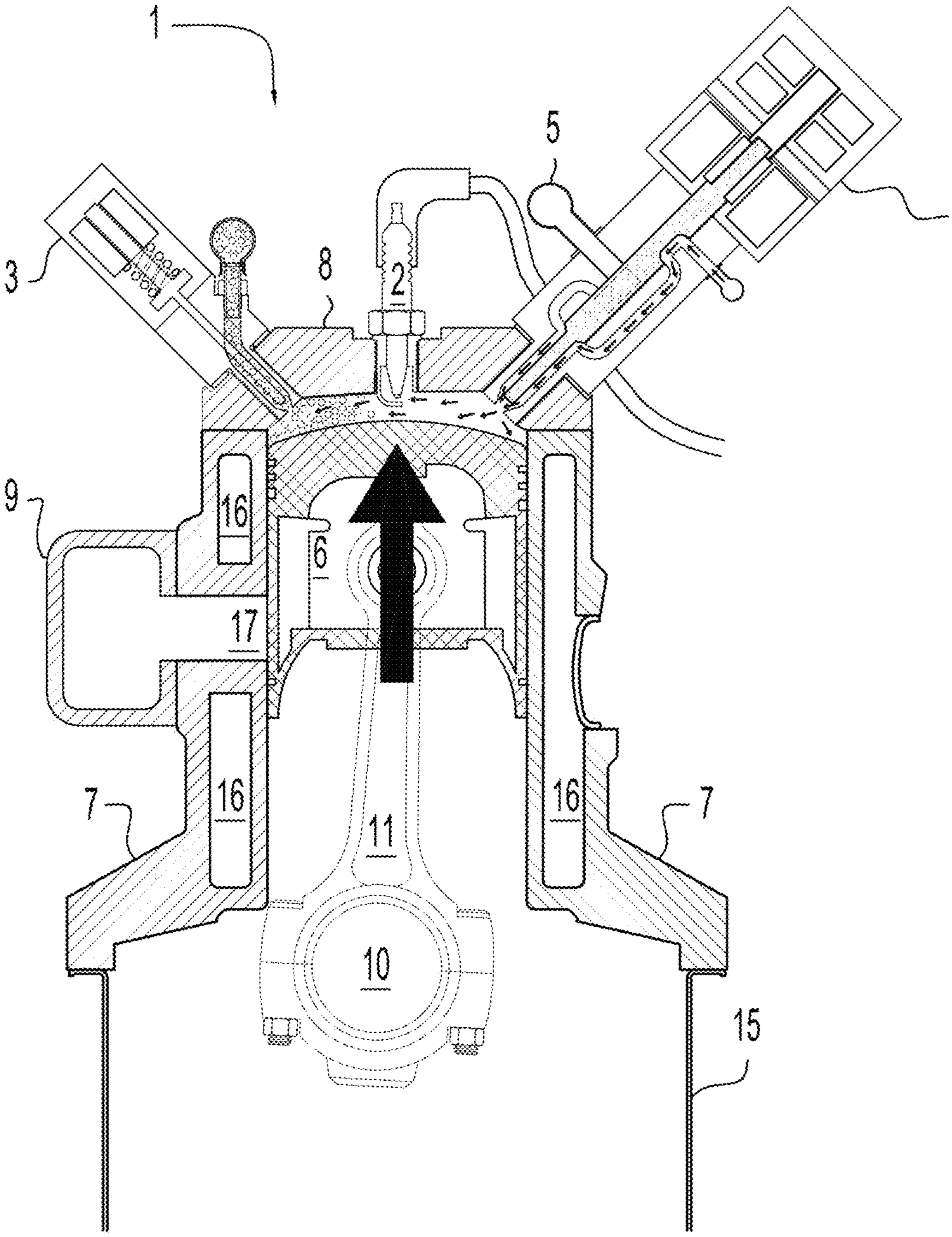
FIG. 2A illustrates the engine cylinder in a state prior to reaching TDC in its cycle, according to one or more implementations herein.

FIG. 2A illustrates the engine cylinder 1 in a state prior to reaching TDC in its cycle, according to one or more implementations herein. Once the engine is in motion and piston 6 nears TDC, air injector 4 and fuel injector 3 may continue to inject air and fuel at a pressure between, for example, 10 and 3000 psi as the controller has determined, for example, based on how much power the cylinder is to create. If the cylinder is in a low pressure air injection operational mode, air injector 4 and fuel injector 3 may begin injection of air and fuel just after piston 6 passed by and closed off exhaust port 17.

Figure 2B:
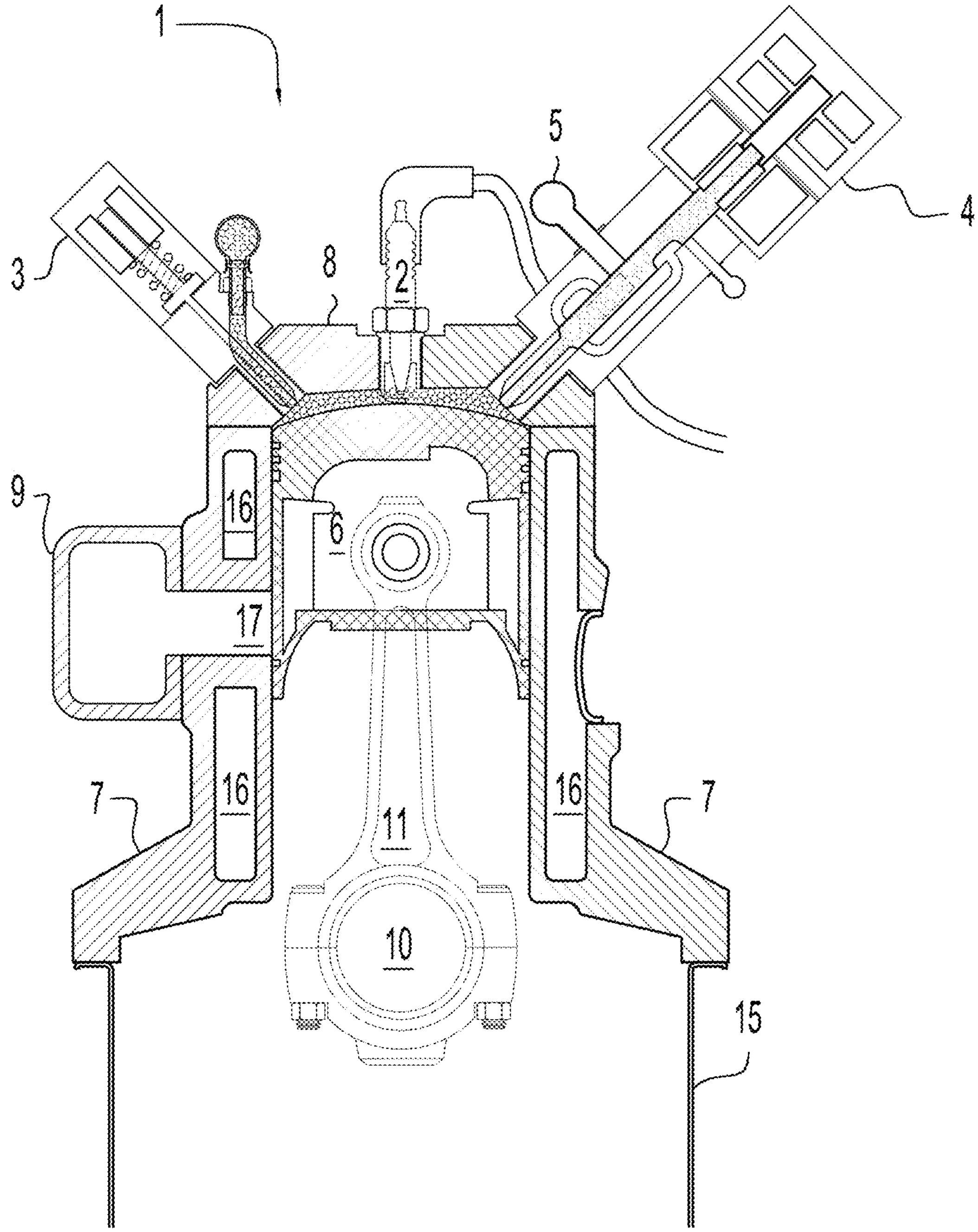
FIG. 2B illustrates the engine cylinder in another state prior to reaching TDC in its cycle, according to one or more implementations herein.

FIG. 2B illustrates the engine cylinder 1 in another state prior to reaching TDC in its cycle, according to one or more implementations herein. As the piston gets even closer to TDC, air injector 4 and fuel injector 3 may close and engine cylinder 1 may be ready for combustion.

Figure 2C:
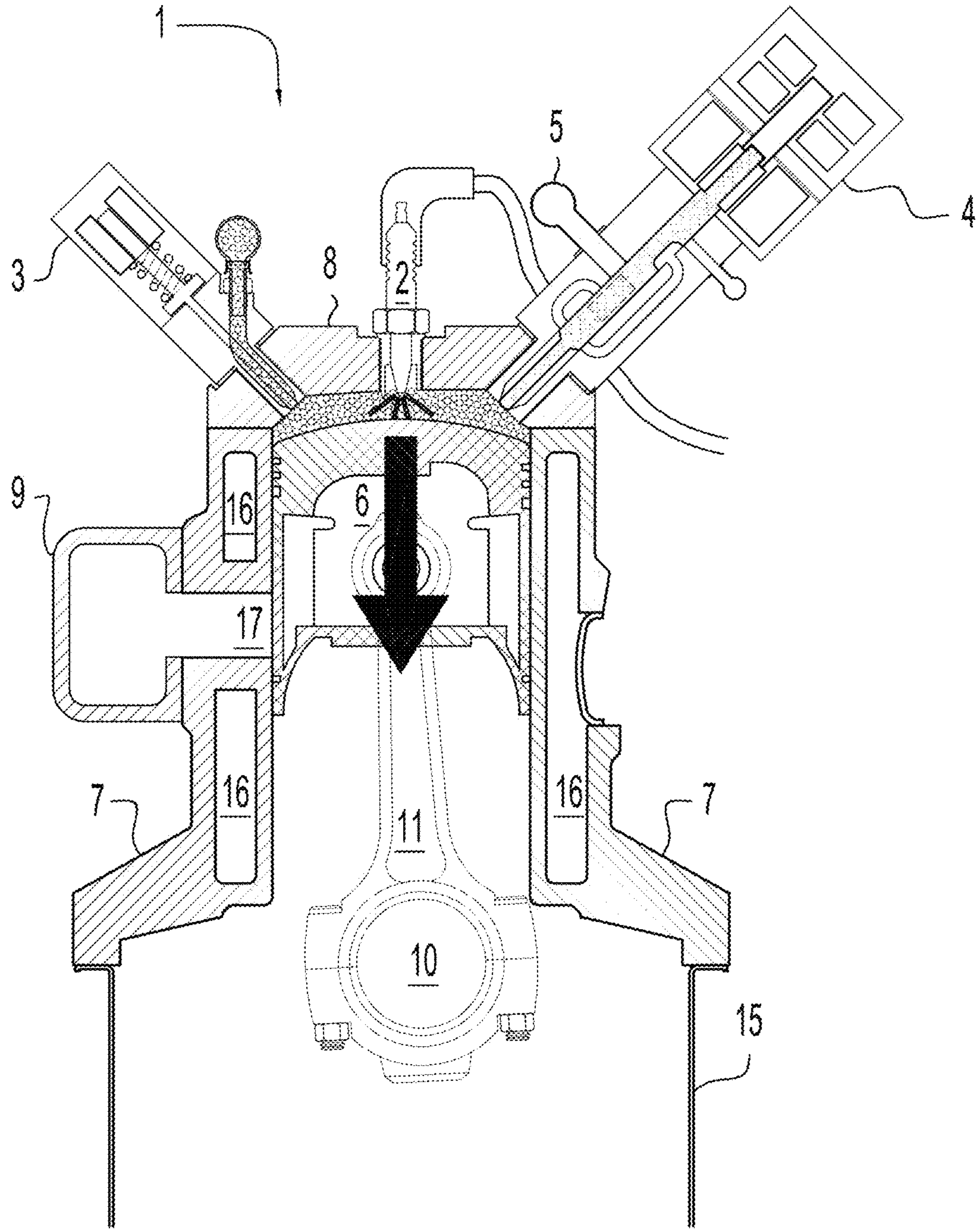
FIG. 2C illustrates the instant of combustion initiation in engine cylinder just before, at, or just after reaching TDC in its cycle, according to one or more implementations herein.

FIG. 2C illustrates the instant of combustion initiation in engine cylinder 1 just before, at, or just after reaching TDC in its cycle, according to one or more implementations herein. With engine cylinder 1 fully charged with air and fuel, the controller may activate the ignition device 2 (e.g., in implementations where ignition device 2 is a spark plug, to generate a spark) to begin combustion for the downward travel of piston 6 to provide the power stroke.

Figure 2D:
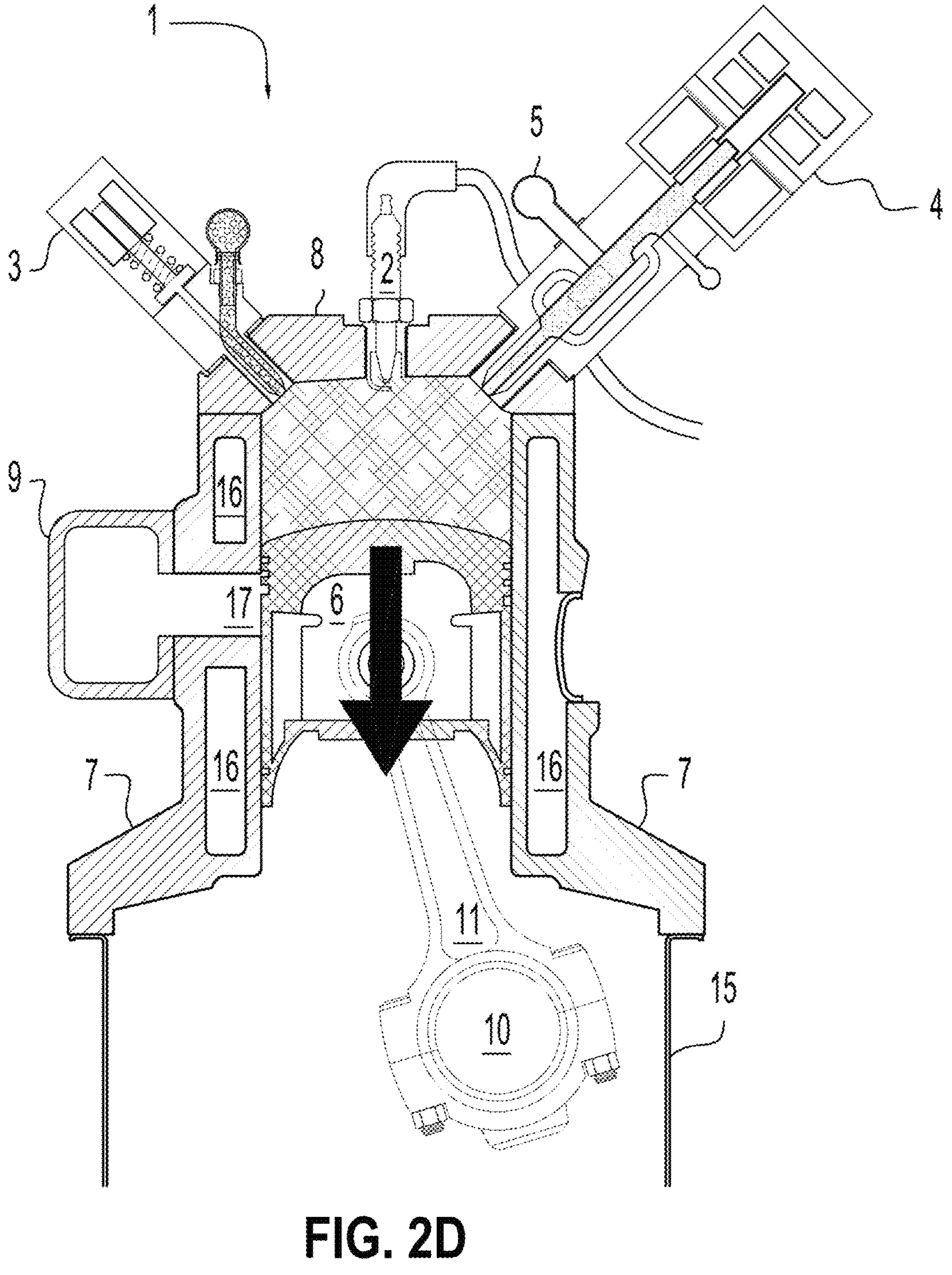
FIG. 2D illustrates a power stroke of engine cylinder, according to one or more implementations herein.

FIG. 2D illustrates a power stroke of engine cylinder 1, according to one or more implementations herein. The combustion in the cylinder may push piston 6 down creating power that rotates the crankshaft.

Figure 2E:
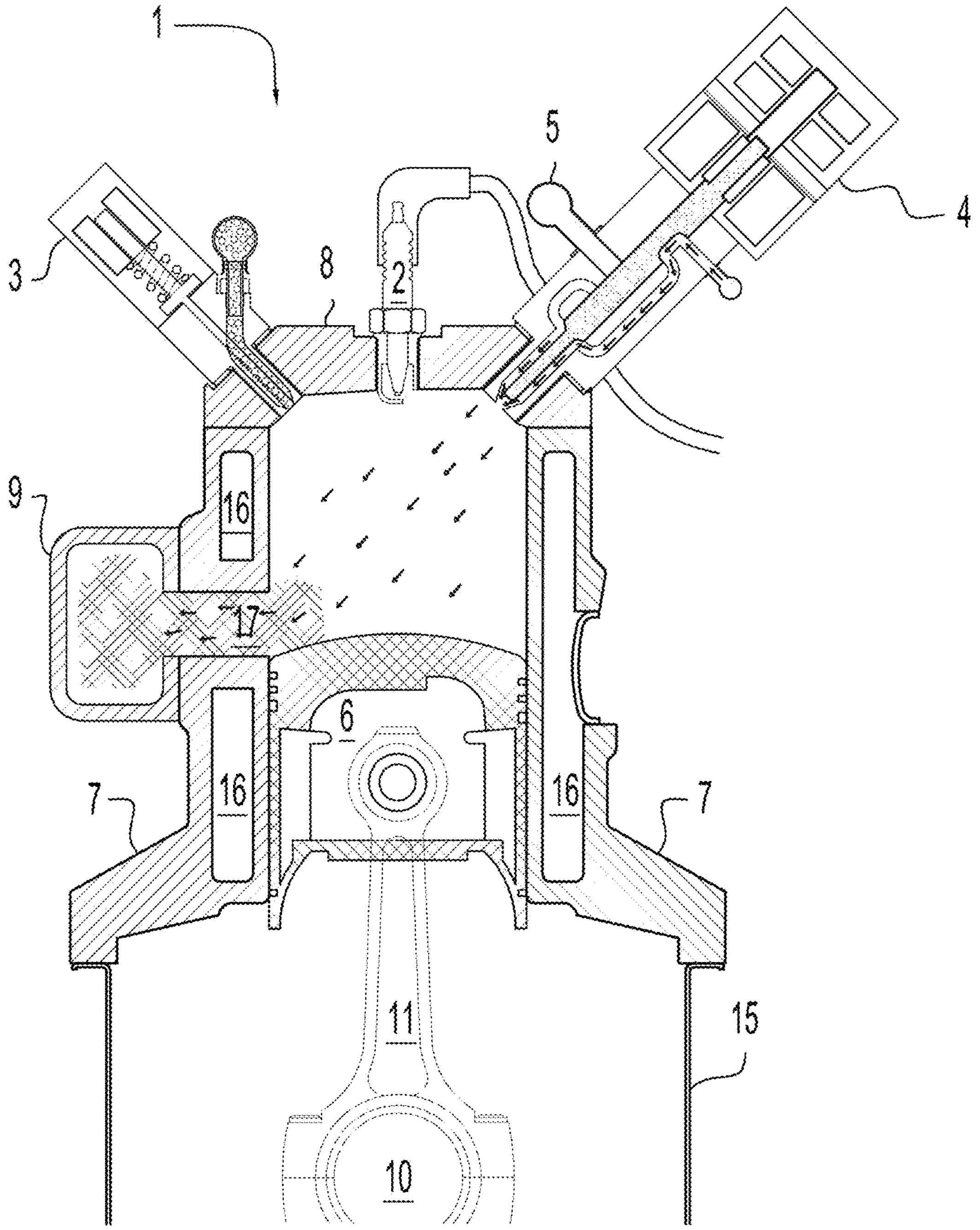
FIG. 2E illustrates an exhaust state of engine cylinder, according to one or more implementations herein.

FIG. 2E illustrates an exhaust state of engine cylinder 1, according to one or more implementations herein. As combustion pushes the piston past exhaust port 17, air injector 4 may assist the cylinder pressure in pushing the exhaust and any leftover fuel out of engine cylinder 1 through exhaust manifold 9 via exhaust port 17.

Figure 2F:
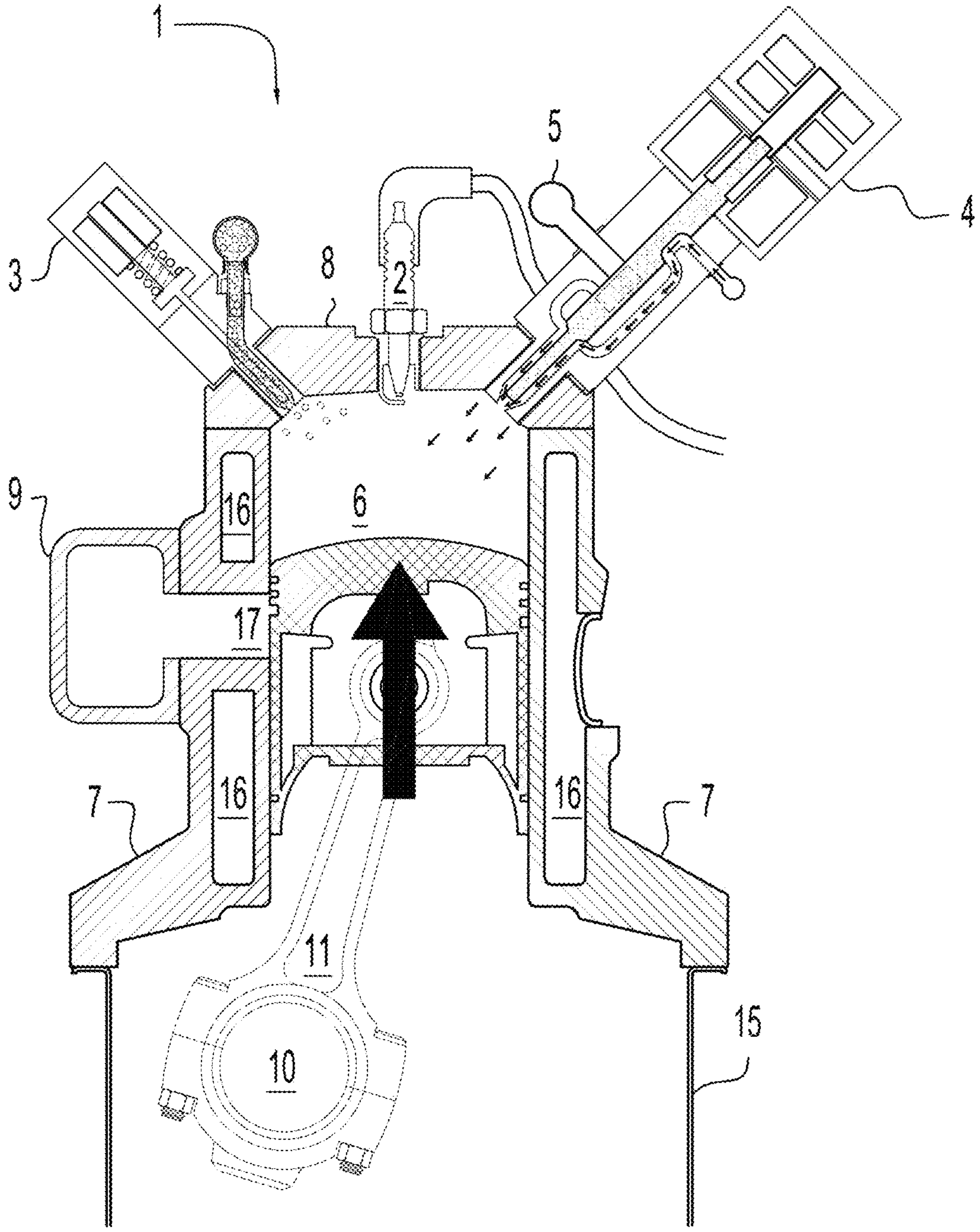
FIG. 2F illustrates a compression stroke of engine cylinder where air and fuel are injected in a low-pressure mode of operation, according to one or more implementations herein.

FIG. 2F illustrates a compression stroke of engine cylinder 1 where air and fuel are injected in a low-pressure mode of operation, according to one or more implementations herein. As piston 6 begins its upward travel, a compression stroke begins after piston 6 passes by the top of exhaust port 17. At this time, air injector 4 and fuel injector 3 may inject low pressure air and fuel as the piston rises (in a low-pressure mode of operation) or wait until the piston is near TDC to will inject high pressure air and fuel (in a high-pressure mode of operation).

Figure 2G:
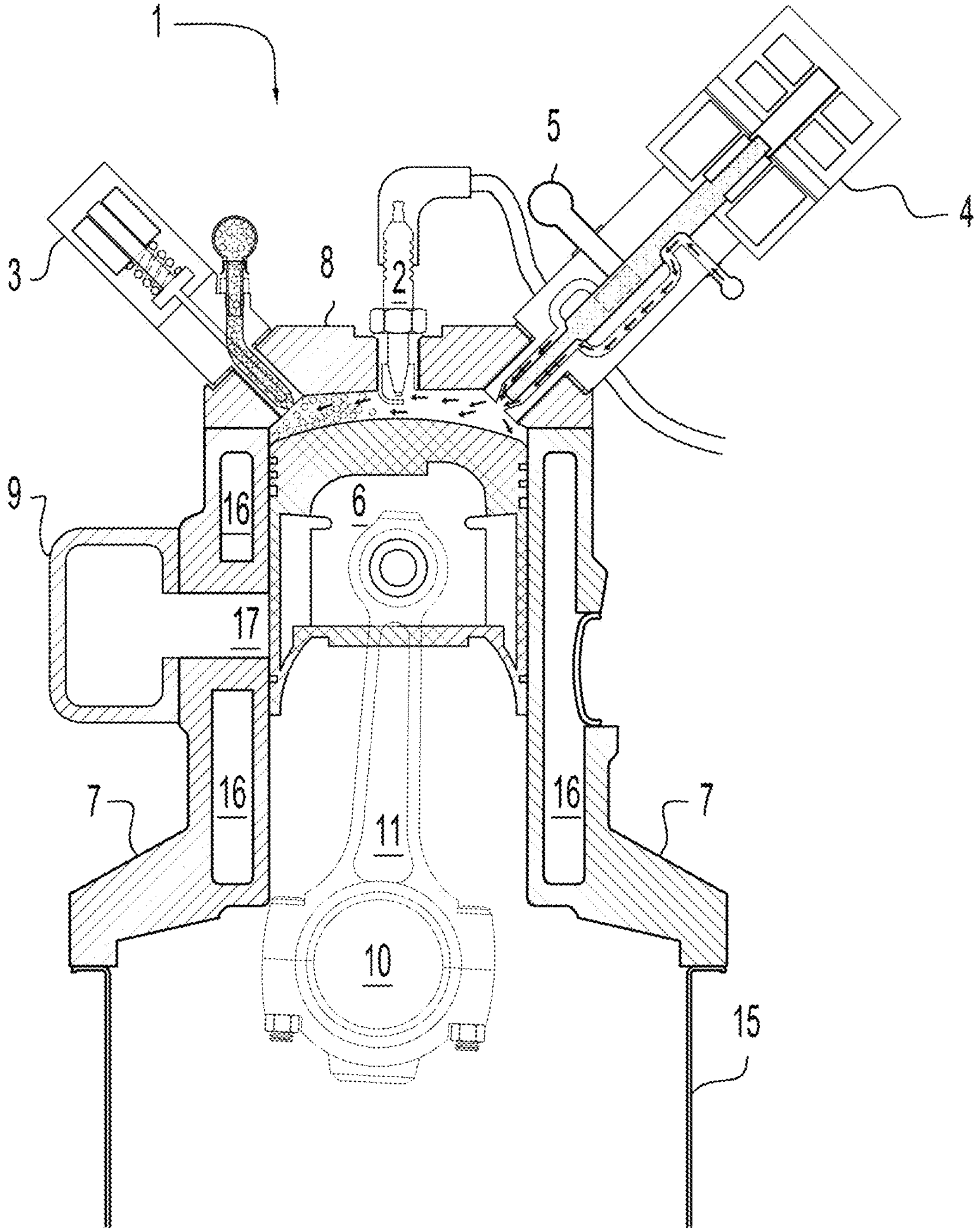
FIG. 2G illustrates engine cylinder in a state just before TDC where air and fuel are injected in a high-pressure mode of operation, according to one or more implementations herein.

FIG. 2G illustrates engine cylinder 1 in a state just before TDC where air and fuel are injected in a high-pressure mode of operation, according to one or more implementations herein. In implementations operating in a high pressure injection mode, when the piston nears TDC, air injector 4 and fuel injector 3 may inject air and fuel at a pressure between, for example 10 psi and 3000 psi, determined by the controller based on how much power the cylinder is to create.

By following the state of FIG. 2F or FIG. 2G, the engine may operate in a two-stroke mode. By selectively forgoing cycles (e.g., by forgoing injection of air and fuel and activation of the ignition device in a given compression/power stroke), a cycle and its strokes may be passive, thus enabling variable cylinder operation (e.g., 4-stroke operation, variable-stroke operation, hit-and-miss operation, or disabled-cylinder operation).

FIGS. 2H, 2J, 2K, and 2L illustrate elevation and plan views of a bi-directional air injector 20 in various states, according to one or more implementations herein. It is understood that bi-directional air injector 20 is a non-exclusive example of an air injector. In this way, bi-directional air injector 20 may compose, for example, air injector 4. Bi-directional air injector 20 may provide for both air flow into and out of a combustion chamber of an engine cylinder. It will be understood that any descriptions of an orientation (e.g., "upper," "upward," "lower," and "downward") are provided as such for understanding the example of bi-directional air injector 20 illustrated in the drawings only and are not limiting as to orientation of bi-directional air injector 20 or any component or aspect thereof.

Bi-directional air injector 20 may comprise an injector needle 30. Injector needle 30 may comprise, for example, non magnetic stainless steel on a lower portion. Injector needle 30 may comprise a compressed air slot 24 and an air relief slot 27. Injector needle 30 may be tapered on a lower end such that it is configured to close the lower injector pathway by when injector needle 30 is fitted against an injector seat 32, or permit opening of the lower injector pathway when injector needle 30 is distanced from injector seat 32. The upper portion of injector needle 30 may comprise a magnetic stainless steel that facilitates upward (open) and downward (closed) travel by energizing the opening or closing one or more linear solenoids 31 located in the upper adjacent portion of bi-directional air injector 20.

Injector needle 30 may be further configured to rotate clockwise and counterclockwise between its open positions to selectively align compressed air slot 24 with a corresponding upper compressed air pathway 25 and lower compressed air pathway 29, or air relief slot 27 with a corresponding upper air relief pathway 26 and lower air relief pathway 28. Upper compressed air pathway 25 may comprise an air supply rail, for example, similar to air supply rail 5. Upper air relief pathway 26 may comprise an air relief rail, which may enable expression of air from the engine cylinder (e.g., to relieve excess pressure as the piston is compressed during a passive stroke). Injector needle 30 may be further configured with one or more needle magnet(s) 23.

Injector needle 30 may be further configured such that its lower portion may selectively seat against an injector seat 32. Injector seat 32 of bi-directional air injector 20 may be proximate the combustion chamber of an engine cylinder, such that when injector needle 30 is not seated against injector seat 32, fluid (e.g., air) flow between the bi-directional air injector 20's internal pathways and the combustion chamber is permitted and when injector needle 30 is seated against injector seat 32, fluid flow between the bi-directional air injector 20's internal pathways and the combustion chamber is restricted (e.g., the injector needle is in a closed position).

Needle magnet(s) 23 may be disposed on an upper portion of injector needle 30, and may interact with the solenoids to facilitate movements of injector needle 30. A rotary solenoid 22 may be configured to cause injector needle 30, via needle magnet(s) 23, to rotate (e.g., 90 degrees, 180 degrees, or another angle), to rotate clockwise or counterclockwise, thereby selectively aligning compressed air slot 24 with corresponding upper compressed air pathway 25 and lower compressed air pathway 29, or air relief slot 27 with its corresponding upper air relief pathway 26 and lower air relief pathway 28.

One or more linear solenoid(s) 31 (e.g., two linear solenoids 31) may be located within bi-directional air injector 20 proximate the upper end of injector needle 30. In one example, there are two linear solenoids 31, with one linear solenoid 31 being configured to effect a downward force on injector needle 30 such that a lower end of injector needle 30 engages injector seat 32, and the other linear solenoid 31 being configured to effect an upward force on injector needle 30 such that the injector needle 30 disengages injector seat 32, thereby permitting fluid flow between the internals of bi-directional air injector 20 and the combustion chamber of the engine cylinder (e.g., to provide selectively for air injection or pressure relief depending on a rotational position of injector needle 30). A magnetic isolator 21 may separate or isolate magnetic forces generated by linear solenoid 31 and rotary solenoid 22.

Figure 2H:
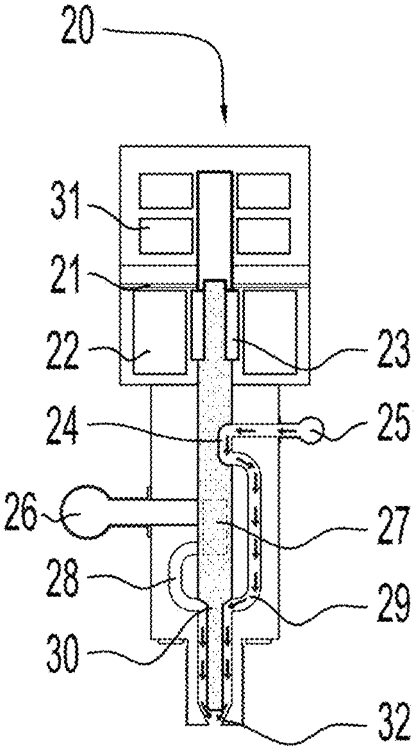
Figure 2H:
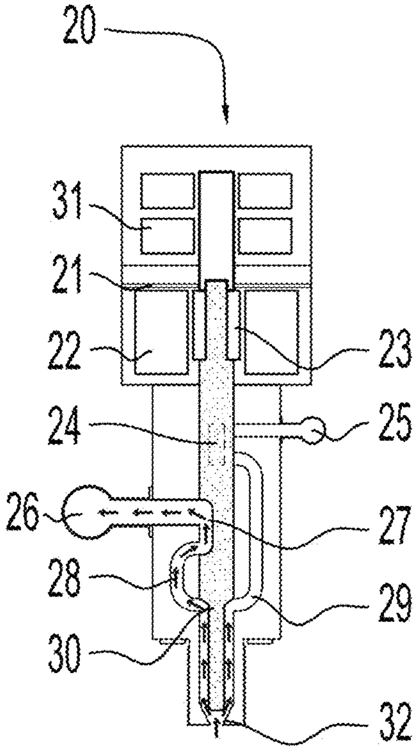
Figure 2H:
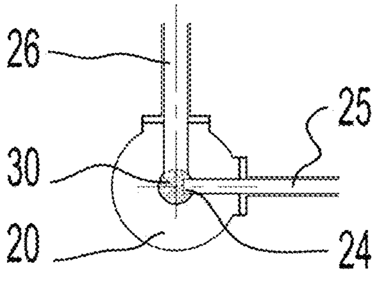

As illustrated by the elevation and plan sections of FIG. 2H, bi-directional air injector 20 may be configured such that when injector needle 30 is aligned both rotationally and linearly for air relief, upper air relief pathway 26 and lower air relief pathway 28 are connected by air relief slot 27, thus enabling fluid flow between the nozzle of bi-directional air injector 20 proximate injector seat 32 and upper air relief pathway 26 (e.g., an outlet or an air relief rail) via lower air relief pathway 28. In this configuration, upper compressed pathway 25 and lower compressed air pathway 29 are not connected by compressed air slot 24. In an implementation, this configuration may permit pressure relief during a passive stroke of an engine cylinder. This rotational position can also remain while the linear position of injector needle 30 is changed to the closed position by the linear solenoid, as illustrated by the elevation and plan sections of FIG. 2L.

Figure 2J:
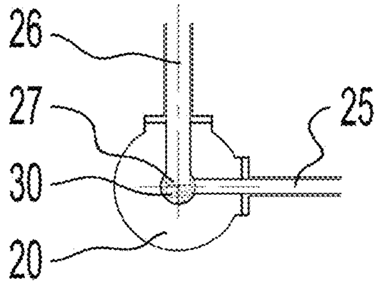

As illustrated by the elevation and plan sections of FIG. 2J, bi-directional air injector 20 may be configured such that when injector needle 30 is aligned both rotationally and linearly for compressed air injection, upper compressed pathway 25 and lower compressed pathway 29 are connected by compressed air slot 24, thus enabling fluid flow between the nozzle of bi-directional air injector 20 proximate injector seat 32 and upper compressed air pathway 25 (e.g., an inlet or a compressed air rail, which may be similar to, for example, compressed air rail 5) via lower compressed air pathway 29. In this configuration, upper air relief pathway 26 and lower air relief pathway 28 are not connected by air relief slot 27. In an implementation, this configuration may permit air injection into an engine cylinder. This rotational position can also remain while the linear position of injector needle 30 is changed to the closed position by the linear solenoid, as illustrated by the elevation and plan sections of FIG. 2K.

Figure 3:
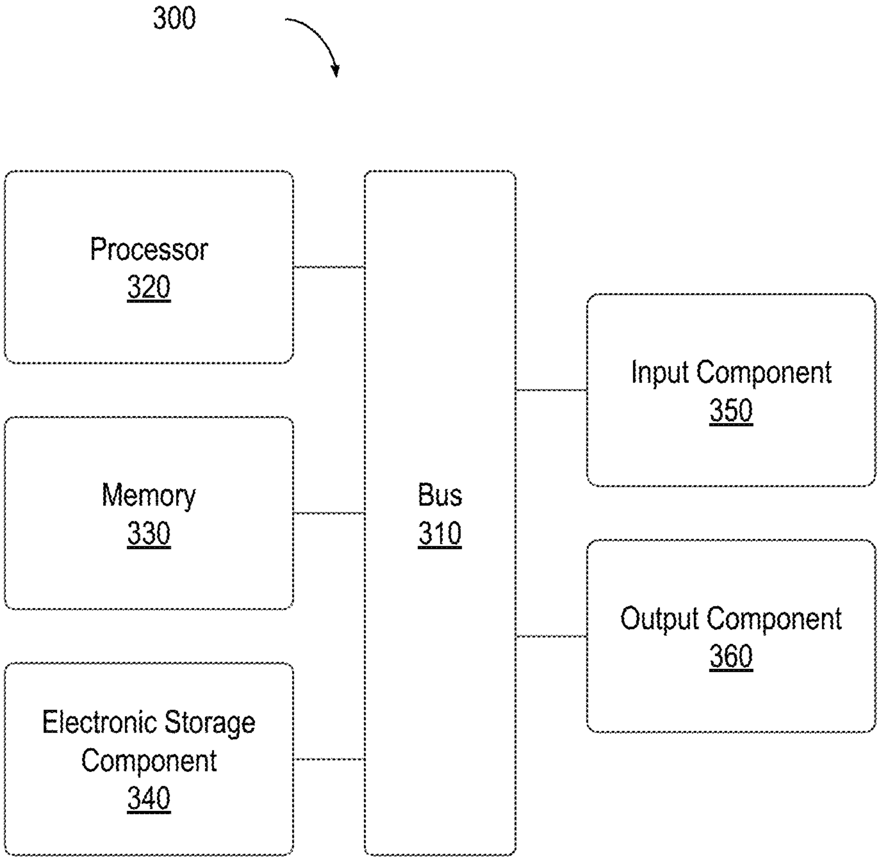
FIG. 3 is a diagram of example components of a device, which may correspond to the controller of FIG. 1, according to one or more implementations herein.

FIG. 3 is a diagram of example components of a device 300, which may correspond to the controller 140 of FIG. 1, according to one or more implementations herein. In some implementations, one or more of the controller 140 of FIG. 1 may include one or more devices 300 and/or one or more components of device 300, which may include a plurality of hardware, software, and/or firmware components operating together to provide the functionality attributed herein to device 300. In some implementations, device 300 may include a distributed computing architecture (e.g., one or more individual computing platforms operating in concert to accomplish a computing task).

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As shown in FIG. 3, device 300 may include a bus 310, a processor 320, a memory 330, a storage component 340, an input component 350, and an output component 360.

Bus 310 includes a component that enables wired and/or wireless communication among the components of device 300.

Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Such processors may or may not be all integral to the same physical device, and may in some embodiments be distributed among several devices.

Processor 320 may be configured to execute one or more of the modules disclosed herein, and/or other modules by software; hardware; firmware; some combination of software, hardware, and/or firmware; and/or other mechanisms for configuring processing capabilities on processor 320. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using system libraries, language libraries, model-view-controller (MVC) principles, application programming interfaces (APIs), system-specific programming languages and principles, cross-platform programming languages and principles, pre-compiled programming languages, markup programming languages, stylesheet languages, "bytecode" programming languages, object-oriented programming principles or languages, other programming principles or languages, C, C++, C #, Java, JavaScript, Python, PHP, HTML, CSS, TypeScript, R, Elm, Unity, VB.Net, Visual Basic, Swift, Objective-C, Perl, Ruby, Go, SQL, Haskell, Scala, Arduino, assembly language, Microsoft Foundation Classes (MFC), Streaming SIMD Extension (SSE), or other technologies or methodologies, as desired.

It should be appreciated that although some modules disclosed herein may be illustrated for example as being implemented within a single processing unit, in embodiments in which processor 320 includes multiple processing units, one or more of modules disclosed herein may be implemented remotely from the other modules. The description of the functionality provided by the different modules disclosed herein is for illustrative purposes, and is not intended to be limiting, as any of modules described herein may provide more or less functionality than is described. For example, one or more of modules disclosed herein may be eliminated, and some or all of its functionality may be provided by other ones of modules disclosed herein. As another example, processor 320 may be configured to execute one or more additional modules that may perform some or all of the functionality attributed herein to one of modules disclosed herein.

Memory 330 includes a random-access memory, a read only memory, and/or another type of memory (e.g., a flash memory, a magnetic memory, and/or an optical memory).

Electronic storage component 340 stores information and/or software related to the operation of device 300. For example, electronic storage component 340 may include a hard disk drive, a magnetic disk drive, an optical disk drive, a solid-state disk drive, a compact disc, a digital versatile disc, and/or another type of non-transitory computer-readable medium. Implementations of electronic storage component 340 may include one or more of optically readable storage media (e.g., optical disks, etc.), magnetically readable storage media (e.g., magnetic hard drive, etc.), electrical charge-based storage media (e.g., EEPROM, RAM, etc.), solid-state storage media (e.g., flash drive, etc.), and/or other electronically readable storage media. Implementations of electronic storage component 340 may include one or both of system storage provided integrally (i.e., substantially non-removable) to device 300 and/or removable storage that is removably connectable to device 300 via, for example, a port (e.g., a USB port, an IEEE 1394 port, a THUNDERBOLT™ port, etc.) or a drive (e.g., disk drive, flash drive, or solid-state drive etc.).

Input component 350 enables device 300 to receive input, such as user input and/or sensed inputs. For example, input component 350 may include a touch screen, a keyboard, a keypad, a mouse, a button, a microphone, a switch, a sensor (e.g., an angular position sensor), a global positioning system component, an accelerometer, a gyroscope, and/or an actuator.

Output component 360 enables device 300 to provide output, such as via a display, a speaker, and/or one or more light-emitting diodes. Output component 360 may further enable device 300 to provide output to control the engine, for example via the fuel injector, air injector, ignition device, and/or compressor.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In addition to the example configuration described herein in FIG. 3, various steps, functions, and/or operations of device 300 and the methods disclosed herein may be carried out by one or more of, for example, electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link.

Figure 4:
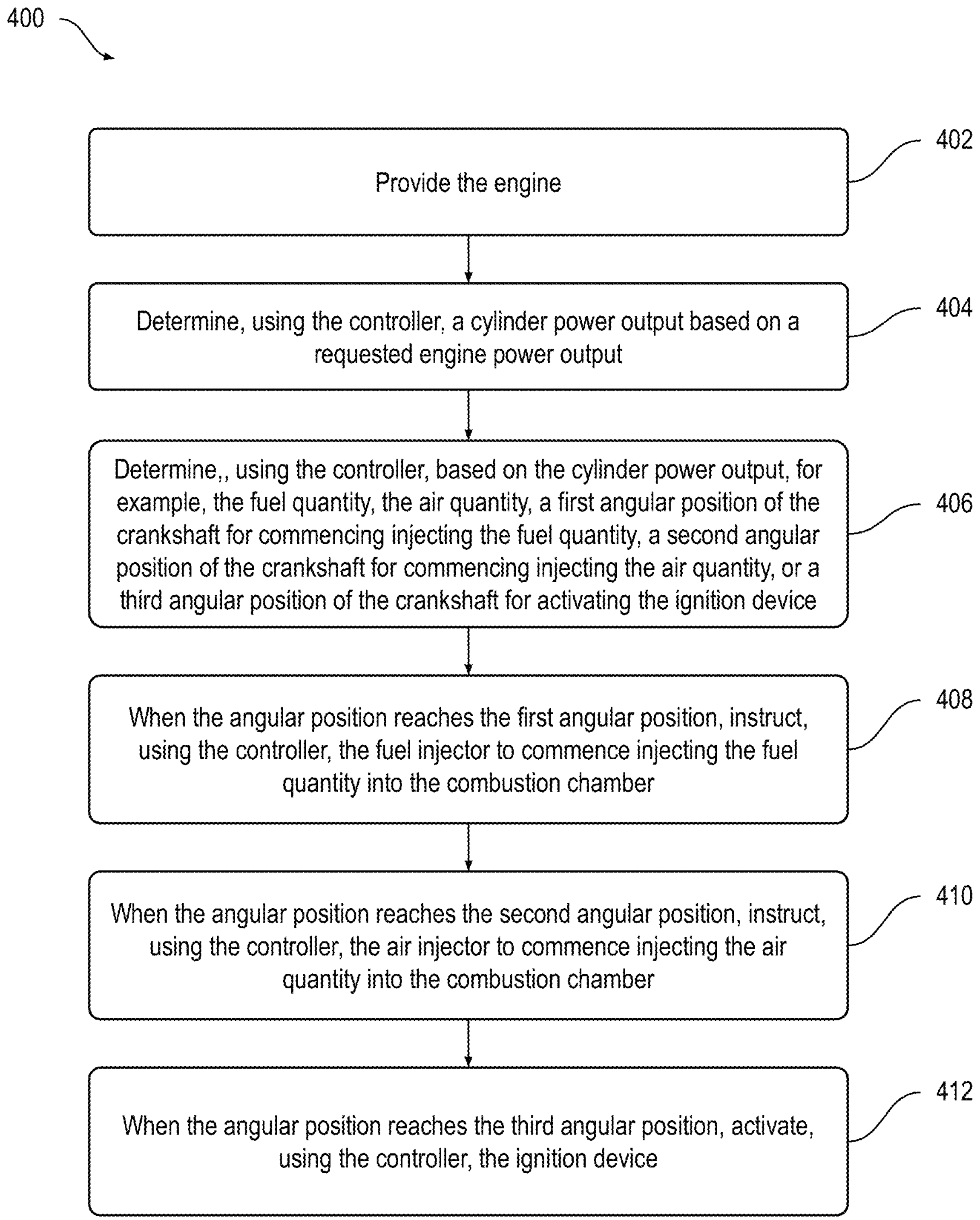
FIG. 4 is a flowchart illustrating an example method for operating a camless engine, according to one or more implementations herein.

FIG. 4 is a flowchart illustrating an example method 400 for operating a camless engine, according to one or more implementations herein. In some implementations, one or more process blocks of FIG. 4 may be performed by one or more components of FIGS. 1-3.

An operation 402 may include providing the engine, and may be performed alone or in combination with one or more other operations depicted in FIG. 4. The engine may include a cylinder, a fuel injector, an air injector, an ignition device, an exhaust port, an angular position sensor, and a controller. The cylinder may include a cylinder wall, a piston having a compression ring disposed about the piston, and a cylinder head, or other components as described herein.

An operation 404 may include determining, using the controller, a cylinder power output based on a requested engine power output, and may be performed alone or in combination with one or more other operations depicted in FIG. 4.

An operation 406 may include determining, using the controller, based on the cylinder power output, for example, the fuel quantity, the air quantity, a first angular position of the crankshaft for commencing injecting the fuel quantity, a second angular position of the crankshaft for commencing injecting the air quantity, or a third angular position of the crankshaft for activating the ignition device, and may be performed alone or in combination with one or more other operations depicted in FIG. 4.

An operation 408 may include, when the angular position reaches the first angular position, instructing, using the controller, the fuel injector to commence injecting the fuel quantity into the combustion chamber, and may be performed alone or in combination with one or more other operations depicted in FIG. 4.

An operation 410 may include, when the angular position reaches the second angular position, instructing, using the controller, the air injector to commence injecting the air quantity into the combustion chamber, and may be performed alone or in combination with one or more other operations depicted in FIG. 4.

An operation 412 may include, when the angular position reaches the third angular position, activating, using the controller, the ignition device, and may be performed alone or in combination with one or more other operations depicted in FIG. 4.

Although FIG. 4 depicts an example method 400 and operations thereof, in some implementations, a method illustrated herein may include additional operations, fewer operations, differently arranged operations, or different operations than the operations depicted in FIG. 4. Moreover, or in the alternative, two or more of the operations depicted in FIG. 4 may be performed at least partially in parallel.

Various characteristics, advantages, implementations, embodiments, and/or examples relating to the invention have been described in the foregoing description with reference to the accompanying drawings. However, the above description and drawings are illustrative only. The invention is not limited to the illustrated implementations, embodiments, and/or examples, and all implementations, embodiments, and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described implementations, embodiments, and/or examples can be rearranged and combined in manners other than specifically described above, with any and all permutations within the scope of the invention, as limited only by the appended claims.

In the claims, various portions may be prefaced with letter or number references for convenience. However, use of such references does not imply a temporal or ordered relationship not otherwise required by the language of the claims. Unless the phrase 'means for' or 'step for' appears in a particular claim or claim limitation, such claim or claim limitation should not be interpreted to invoke 35 U.S.C. § 112(f).

As used herein, satisfying a threshold may, depending on the context, refer to a value being greater than the threshold, greater than or equal to the threshold, less than the threshold, less than or equal to the threshold, equal to the threshold, and/or the like, depending on the context.

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

I claim:

1. An engine, comprising:

a cylinder including a cylinder wall, a piston, a compression ring disposed about the piston, and a cylinder head wherein:

the cylinder wall, the piston, the compression ring, and the cylinder head define a combustion chamber; and the piston is configured to slide between a first position of the piston within the cylinder and a second position of the piston within the cylinder, wherein a volume of the combustion chamber is greater when the piston is in the second position relative to when the piston is in the first position;

a fuel injector integrated with the cylinder head and in fluid communication with the combustion chamber, the fuel injector configured to inject a fuel quantity into the combustion chamber during a stroke of the piston;

an air injector integrated with the cylinder head and in fluid communication with the combustion chamber via a nozzle, the air injector configured to inject an air quantity to the combustion chamber during the stroke of the piston, wherein the air injector is defined by at least an inlet, an outlet, the nozzle, a first internal pathway, and a second internal pathway; and the air injector comprises an injector needle including a first slot and a second slot; wherein the air injector is configured such that:

when the injector needle is in a first open position, the first slot is aligned with the inlet and the first internal pathway such that the inlet and the nozzle are in fluid communication via the first internal pathway and the second slot is not aligned with the outlet and the second internal pathway, thereby restricting fluid communication between the outlet and the nozzle;

when the injector needle is in a second open position, the second slot is aligned with the outlet and the second internal pathway such that the outlet and the nozzle are in fluid communication via the second internal pathway and the first slot is not aligned with the inlet and the first internal pathway, thereby restricting fluid communication between the inlet and the nozzle; and when the injector needle is in a closed position, the injector needle restricts fluid communication between the nozzle and both the first internal pathway and the second internal pathway;

an ignition device in communication with the combustion chamber;

an exhaust port in fluid communication with an exhaust manifold and the cylinder such that passage of fluid between the exhaust port and the combustion chamber is prevented by the compression ring when the piston is in the first position;

an angular position sensor configured to measure an angular position of a crankshaft in mechanical communication with the piston; and a controller is configured to:

determine a cylinder power output based on a requested engine power output;

determine, based on the cylinder power output:

the fuel quantity;

the air quantity;

a first angular position of the crankshaft for commencing injecting the fuel quantity;

a second angular position of the crankshaft for commencing injecting the air quantity; and a third angular position of the crankshaft for activating the ignition device;

when the angular position reaches the first angular position, instruct the fuel injector to commence injecting the fuel quantity into the combustion chamber;

when the angular position reaches the second angular position, instruct the air injector to commence injecting the air quantity into the combustion chamber; and when the angular position reaches the third angular position, activate the ignition device;

wherein the engine does not comprise a camshaft, an intake valve configured to seat to the cylinder head, or an exhaust valve configured to seat to the cylinder head.

2. The engine of claim 1, wherein the first position of the piston is a top-dead-center position of the piston and the second position of the piston is a bottom-dead-center position of the piston.

3. The engine of claim 1, wherein the stroke of the piston is a power stroke of the piston or a compression stroke of the piston.

4. The engine of claim 1, wherein the controller is configured to control the fuel injector, the air injector, and the ignition device such that the engine operates in a two-stroke mode, a variable-stroke mode, or a hit-and-miss mode.

5. The engine of claim 1, wherein the ignition device is a spark plug.

6. An engine, comprising:

a cylinder including a cylinder wall, a piston, a compression ring disposed about the piston, and a cylinder head wherein:

the cylinder wall, the piston, the compression ring, and the cylinder head define a combustion chamber; and the piston is configured to slide between a first position of the piston within the cylinder and a second position of the piston within the cylinder, wherein a volume of the combustion chamber is greater when the piston is in the second position relative to when the piston is in the first position;

a fuel injector in fluid communication with the combustion chamber, the fuel injector configured to inject a fuel quantity into the combustion chamber during a stroke of the piston;

an air injector in fluid communication with the combustion chamber, the air injector configured to inject an air quantity to the combustion chamber during the stroke of the piston;

an ignition device in communication with the combustion chamber;

an exhaust port in fluid communication with an exhaust manifold and the cylinder such that passage of fluid between the exhaust port and the combustion chamber is prevented by the compression ring when the piston is in the first position;

an angular position sensor configured to measure an angular position of a crankshaft in mechanical communication with the piston; and a controller configured to control the fuel injector, the air injector, and the ignition device;

wherein the engine does not comprise a camshaft.

7. The engine of claim 6, wherein the air injector is defined by at least an inlet, an outlet, a nozzle, a first internal pathway, and a second internal pathway; and the air injector comprises an injector needle including a first slot and a second slot; wherein the air injector is configured such that:

when the injector needle is in a first open position, the first slot is aligned with the inlet and the first internal pathway such that the inlet and the nozzle are in fluid communication via the first internal pathway and the second slot is not aligned with the outlet and the second internal pathway, thereby restricting fluid communication between the outlet and the nozzle;

when the injector needle is in a second open position, the second slot is aligned with the outlet and the second internal pathway such that the outlet and the nozzle are in fluid communication via the second internal pathway and the first slot is not aligned with the inlet and the first internal pathway, thereby restricting fluid communication between the inlet and the nozzle; and when the injector needle is in a closed position, the injector needle restricts fluid communication between the nozzle and both the first internal pathway and the second internal pathway.

8. The engine of claim 6, wherein the controller is configured to determine a cylinder power output based on a requested engine power output.

9. The engine of claim 8, wherein the controller is configured to determine, based on the cylinder power output:

the fuel quantity;

the air quantity;

a first angular position of the crankshaft for commencing injecting the fuel quantity;

a second angular position of the crankshaft for commencing injecting the air quantity; and a third angular position of the crankshaft for activating the ignition device.

10. The engine of claim 9, wherein the controller is further configured to:

when the angular position reaches the first angular position, instruct the fuel injector to commence injecting the fuel quantity into the combustion chamber;

when the angular position reaches the second angular position, instruct the air injector to commence injecting the air quantity into the combustion chamber; and when the angular position reaches the third angular position, activate the ignition device.

11. The engine of claim 6, wherein the ignition device is a spark plug.

12. The engine of claim 6, wherein the fuel injector or the air injector is integrated with the cylinder head.

13. The engine of claim 6, wherein the first position of the piston is a top-dead-center position of the piston.

14. The engine of claim 6, wherein the second position of the piston is a bottom-dead-center position of the piston.

15. The engine of claim 6, wherein the engine does not comprise an intake valve configured to seat to the cylinder head, or an exhaust valve configured to seat to the cylinder head.

16. The engine of claim 6, wherein the stroke of the piston is a power stroke or a passive stroke of the piston or a compression stroke of the piston.

17. The engine of claim 6, wherein the air quantity injected is sufficient to develop a pressure ranging from 10 to 3000 psi within the combustion chamber.

18. The engine of claim 6, wherein the controller is configured to control the fuel injector, the air injector, and the ignition device by:

when the angular position reaches a first angular position, instruct the fuel injector to commence injecting the fuel quantity into the combustion chamber;

when the angular position reaches a second angular position, instruct the air injector to commence injecting the air quantity into the combustion chamber; and when the angular position reaches a third angular position, activate the ignition device.

19. The engine of claim 6, wherein the controller is configured to control the fuel injector, the air injector, and the ignition device such that the engine operates in a two-stroke mode, a four-stroke mode, or a hit-and-miss mode.

20. A method of operating an engine, comprising:

providing the engine, the engine comprising:

a cylinder including a cylinder wall, a piston, a compression ring disposed about the piston, and a cylinder head wherein:

the cylinder wall, the piston, the compression ring, and the cylinder head define a combustion chamber; and the piston is configured to slide between a first position of the piston within the cylinder and a second position of the piston within the cylinder, wherein a volume of the combustion chamber is greater when the piston is in the second position relative to when the piston is in the first position;

a fuel injector in fluid communication with the combustion chamber, the fuel injector configured to inject a fuel quantity based on a cylinder power output into the combustion chamber during a stroke of the piston;

an air injector in fluid communication with the combustion chamber, the air injector configured to inject an air quantity based on the cylinder power output into the combustion chamber during the stroke of the piston;

an ignition device in communication with the combustion chamber;

an angular position sensor configured to measure an angular position of a crankshaft in mechanical communication with the piston;

an exhaust port in fluid communication with an exhaust manifold and the cylinder such that passage of fluid between the exhaust port and the combustion chamber is prevented by the compression ring when the piston is in the first position; and a controller configured to control the fuel injector, the air injector, and the ignition device;

wherein the engine does not comprise a camshaft, an intake valve configured to seat to the cylinder head, or an exhaust valve configured to seat to the cylinder head;

determining, using the controller, a cylinder power output based on a requested engine power output;

determining, using the controller, based on the cylinder power output:

the fuel quantity;

the air quantity;

a first angular position of the crankshaft for commencing injecting the fuel quantity;

a second angular position of the crankshaft for commencing injecting the air quantity; and a third angular position of the crankshaft for activating the ignition device;

when the angular position reaches the first angular position, instructing, using the controller, the fuel injector to commence injecting the fuel quantity into the combustion chamber;

when the angular position reaches the second angular position, instructing, using the controller, the air injector to commence injecting the air quantity into the combustion chamber; and when the angular position reaches the third angular position, activating, using the controller, the ignition device.

* * * * *